US006321340B1

(12) United States Patent
Shin et al.

(10) Patent No.: US 6,321,340 B1
(45) Date of Patent: Nov. 20, 2001

(54) CABLE MANAGER SYSTEM AND COMPUTER THEREWITH

(75) Inventors: Seong-Kee Shin; Chang-Hee Suwon, both of Kyunggi-doo; Yong Sik Park, Seoul, all of (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/173,553

(22) Filed: Oct. 16, 1998

(30) Foreign Application Priority Data

Oct. 17, 1997 (KR) .................................................. 97-53476

(51) Int. Cl.[7] .............................. G06F 1/26; G06F 1/28; G06F 1/30
(52) U.S. Cl. ...................... 713/310; 713/300; 713/320; 713/324; 713/330; 439/131; 439/188; 439/638; 439/676; 710/1; 710/2; 710/8
(58) Field of Search ................................. 713/310, 300, 713/320, 324, 330; 439/131, 676, 638, 188; 710/1, 2, 8

(56) References Cited

U.S. PATENT DOCUMENTS

| | | |
|---|---|---|
| 4,956,561 | 9/1990 | Tamer . |
| 5,181,858 * | 1/1993 | Matz et al. ............................ 439/188 |
| 5,222,164 * | 6/1993 | Bass, Sr. et al. ....................... 385/14 |
| 5,301,334 | 4/1994 | Horiuchi . |
| 5,365,230 * | 11/1994 | Kikinis ................................... 341/22 |
| 5,408,669 * | 4/1995 | Stewart et al. ....................... 713/300 |
| 5,430,883 | 7/1995 | Horiuchi . |
| 5,460,547 | 10/1995 | Belt et al. . |
| 5,519,851 * | 5/1996 | Bender et al. ........................ 395/500 |
| 5,567,180 | 10/1996 | Seo . |
| 5,569,052 * | 10/1996 | Belt et al. ............................. 439/638 |
| 5,570,010 * | 10/1996 | Jin et al. ................................ 324/67 |
| 5,642,517 | 6/1997 | Shirota . |
| 5,649,001 * | 7/1997 | Thomas et al. .................... 379/93.07 |
| 5,687,387 | 11/1997 | Endejan et al. . |
| 5,721,836 | 2/1998 | Scharnberg et al. . |
| 5,721,887 | 2/1998 | Nakajima . |
| 5,739,597 * | 4/1998 | Bailey et al. .......................... 307/85 |
| 5,748,972 | 5/1998 | Clark et al. . |
| 5,752,050 * | 5/1998 | Hernandez et al. ................. 713/330 |
| 5,765,001 | 6/1998 | Clark et al. . |
| 5,864,708 * | 1/1999 | Croft et al. ............................. 710/1 |
| 5,905,249 * | 5/1999 | Reddersen et al. ............. 235/462.15 |

* cited by examiner

Primary Examiner—Ayaz Sheikh
Assistant Examiner—Frantz B. Jean
(74) Attorney, Agent, or Firm—Robert E. Bushnell, Esq.

(57) ABSTRACT

A computer system provided with a cable manager capable of connecting or disconnecting a variety of peripheral devices to or from a computer of the computer system by a single operation thereof, includes: a single integrated connector connected to a computer of the computer system, a plurality of peripheral device ports connected to respective ports of the peripheral devices, the peripheral device ports having a variety of shapes, a LAN modular connector for connecting the computer to a LAN server, and a LAN client card connected to the LAN modular connector.

18 Claims, 4 Drawing Sheets

CABLE MANAGER SYSTEM AND COMPUTER THEREWITH

CLAIM OF PRIORITY

This application makes reference to, incorporates the same herein, and claims all benefits accruing under 35 U.S.C. §119 from an application for CABLE MANAGER SYSTEM AND COMPUTER WITH THE SAME earlier filed in the Korean Industrial Property Office on Oct. 17, 1997 and there duly assigned Ser. No. 53476/1997.

BACKGROUND OF THE INVENTION

1. Field of the Invention

The present invention relates to personal computers, and more particularly to a cable manager system for connecting a variety of peripheral devices to a computer.

2. Description of the Related Art

U.S. Pat. No. 5,567,180 issued to Seo and U.S. Pat. Nos. 5,460,547 and 5,569,052 issued to Belt et al disclose cable managers or port replicators having a configuration for integrating all connectors of peripheral devices connected to a computer requiring frequent movements thereof as in portable computers, thereby being capable of eliminating the inconvenience resulting from manipulations for individually connecting those peripheral devices to the computer to attach the peripheral devices to the computer and disconnecting the peripheral devices from the computer to separate the peripheral devices from the computer. Such cable managers provide convenience in that they can connect or disconnect peripheral devices to or from a computer in one operation.

In such cable managers, there is an accelerated consumption of battery electric power because even when no electric power is supplied from an AC power supply, the supply of electric power is continued through a battery. Furthermore, where the battery voltage is lower than a normal voltage, the computer system may operate erroneously. In severe cases, the computer system may be shut down.

The following patents each disclose features in common with the present invention: U.S. Pat. No. 5,687,387 to Endejan et al., entitled Enhanced Active Port Replicator Having Expansion And Upgrade Capabilities, U.S. Pat. No. 4,956,561 to Tamer, entitled Smart Power Connector, U.S. Pat. No. 5,721,887 to Nakajima, entitled Microcomputer Including A Circuit For Generating A Reset Signal When The Supply Voltage Is Below A Threshold Level, U.S. Pat. No. 5,748,972 to Clark et al, entitled Computer System Which Is Operative To Change From A Normal Operating State To A Suspend State When A Power Supply Thereof Detects That An External Source Is No Longer Providing Power To Said Power Supply At A Predetermined Level, U.S. Pat. No. 5,765,001 to Clark et al., entitled Computer System Which Is Operative To Change From A Normal Operating State To A Suspend State When A Power Supply Thereof Detects That An External Source Is No Longer Providing Power To Said Power Supply At A Predetermined Level, U.S. Pat. No. 5,642,517 to Shirota, entitled Docking System, U.S. Pat. No. 5,430,883 to Horiuchi, entitled Function Expansion Unit Capable Of Supplying Power To Computer, U.S. Pat. No. 5,301,334 to Horiuchi entitled Function Expansion Unit Capable Of Supplying Power To computer, U.S. Pat. No. 5,721,836 to Scharnberg et al., entitled Method And Apparatus For Sensing And Changing The State Of A Computer Before Connecting The Computer To Or Disconnecting The Computer From AN Expansion Unit, U.S. Pat. No. 5,569,052 to Belt et al, entitled Computer For Use With A Port Replicator, U.S. Pat. No. 5,567,180 to Seo, entitled Cable Manager System Of A Computer, and U.S. Pat. No. 5,460,547 to Belt et al., entitled Port Replicator.

SUMMARY OF THE INVENTION

Therefore, an object of the invention is to provide a computer system provided with a cable manager capable of connecting or disconnecting a variety of peripheral devices to or from a computer of the computer system by a single operation thereof while operating only when a stable power supply voltage is supplied to the computer system.

Another object of the invention is to provide a cable manager including a local area network (LAN) client unit adapted to carry out an interface between a personal computer and a LAN hub, and to provide a computer system provided with such a cable manager.

Another object of the invention is to provide a computer system, in which a cable manager capable of connecting or disconnecting a variety of peripheral devices to or from a portable computer of the computer system by a single operation thereof is incorporated, the computer system including a power management circuit adapted to automatically cut off the power supply to the cable manager when the portable computer is energized by a battery.

In accordance with one aspect, the present invention provides a cable manager system for connecting a plurality of peripheral devices to a computer, comprising: a single integrated connector connected to the computer; a plurality of peripheral device ports connected to respective ports of the peripheral devices, the peripheral device ports having a variety of shapes; at least one functional circuit adapted to provide at least one additional function to the computer; an ID information generating unit for generating ID information for identifying the type of cable manager system; and a means for connecting the peripheral device ports, the at least one functional circuit and the ID information generating unit to the integrated connector via internal electrical wiring.

In accordance with another aspect, the present invention provides a computer system comprising: a computer having a housing; a first common connector attached to the computer housing; a cable manager having a housing, the cable manager detachably attached to the computer housing; at least one functional circuit installed in the cable manager housing and adapted to provide at least one additional function to the computer; a second common connector attached to the cable manager housing, the second common connector mating with the first common connector; a plurality of peripheral device ports attached to the cable manager housing and connected to respective ports of peripheral devices, the peripheral device ports having a variety of shapes; an ID information generating unit installed in the cable manager housing and adapted to generate ID information for identifying the cable manager; and means for connecting the peripheral device ports, the at least one functional circuit and the ID information generating unit to the second common connector via internal electrical wiring.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
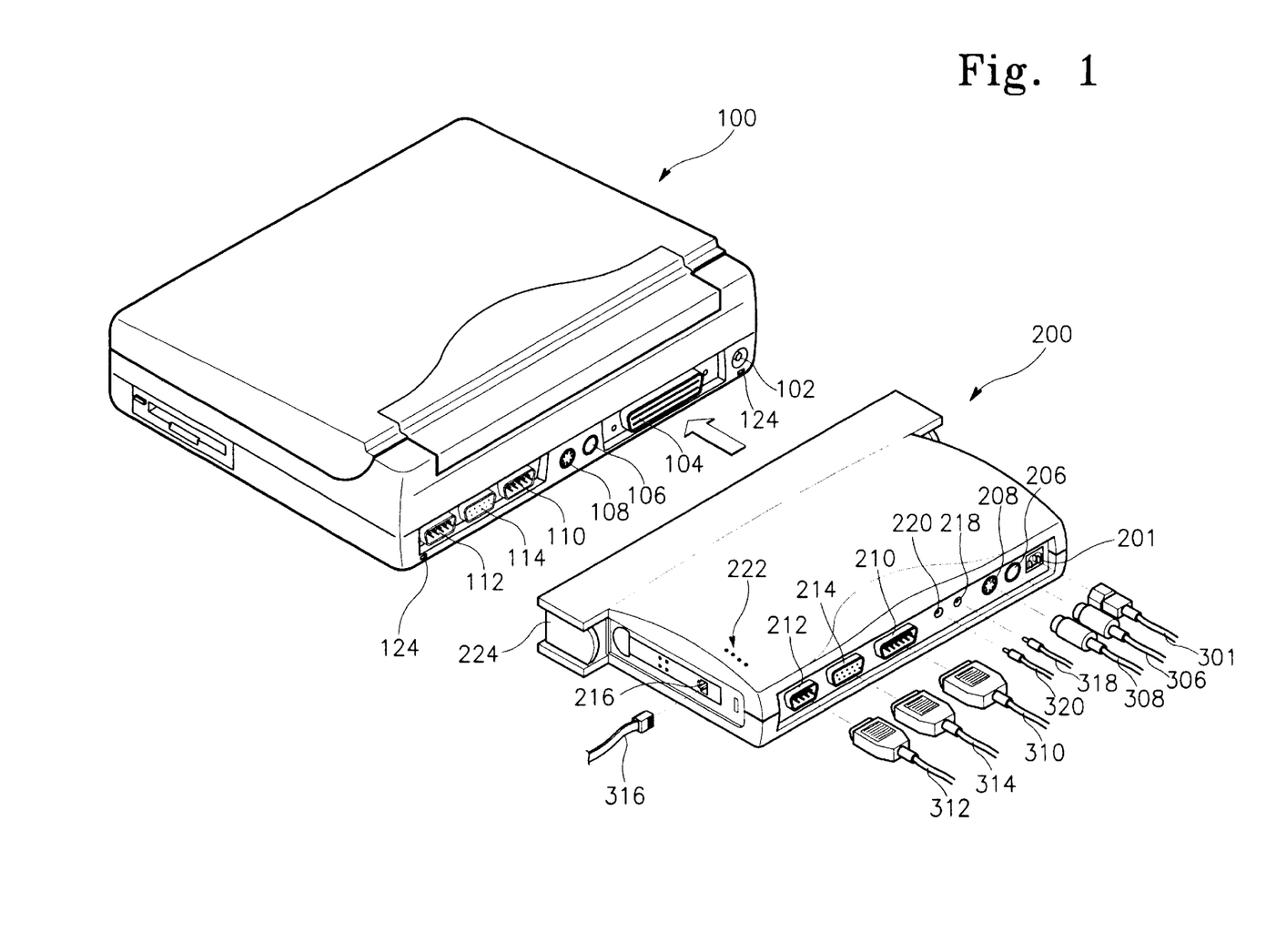
FIG. 1 is a perspective view schematically illustrating a computer system according to a preferred embodiment of the present invention.
Figure 2:
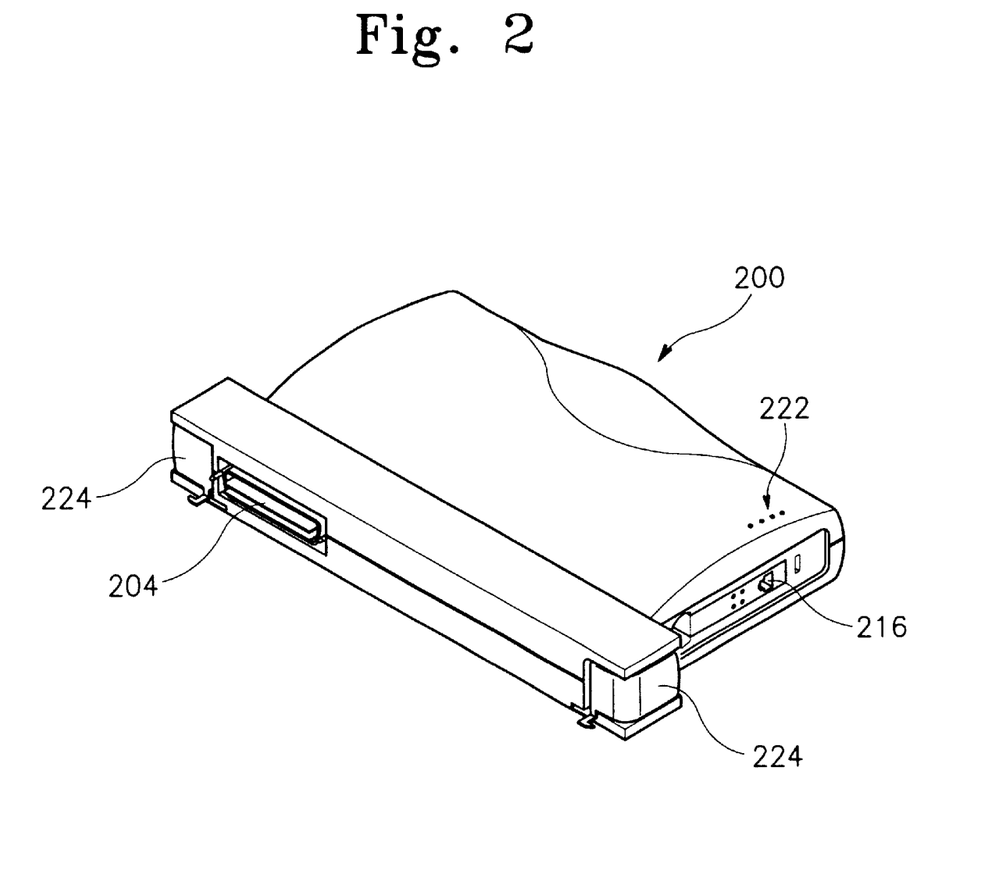
FIG. 2 is a perspective view schematically illustrating a cable manager provided with a common connector for a connection with a common connector of the computer shown in FIG. 1.

FIG. 1 illustrates a cable manager according to a preferred embodiment of the present invention and a portable computer of a notebook or sub-notebook size to which the cable manager is connectable. FIG. 2 illustrates one side of the cable manager shown in FIG. 1.

Referring to FIG. 1, the portable computer and cable manager, which are denoted by the reference numerals 100 and 200, have housings detachably coupled to each other, respectively. The portable computer 100 is provided with a common connector 104 having 240 pins for an electrical connection thereof with the cable manager 200. The common connector 104 is fixedly attached to the housing of the portable computer 100. As shown in FIG. 2, the cable manager 200 is provided with a common connector 204 mating with the common connector 104. These common connectors will be described in detail hereinafter.

Referring to FIG. 1 again, as in general computers, the computer 100 includes a DC input jack 102, a port 106 for a connection with a mouse (referred to as a "mouse port"), a port 108 for a connection with an external keyboard (referred to as a "keyboard port"), a parallel port 110 for a connection with a printer or external CD-ROM driver, a serial port 112 for a connection with an external modem, and a port 114 for a connection with a display monitor (referred to as a "video port"). The housing of the computer 100 has latch notches 124.

The cable manager 200 includes an AC adapter (not shown) attached in the housing of the cable manager 200 and adapted to convert an AC voltage into a DC voltage. An AC input jack 201 is attached to the housing of the cable manager 200 in order to supply an AC voltage to the AC adapter. Similar to the computer 100, the cable manager 200 also includes ports for connections with peripheral devices, namely, a mouse port 206, a keyboard port 208, a parallel port 210, a serial port 212, and a video port 214. The cable manager 200 further includes at least one functional circuit (for example, a LAN card, a graphic card, a modem circuit, etc.) adapted to provide one or more additional functions to the computer 100. The functional circuit has the form of a typical extension card circuit. For the sake of simplicity, the following description will be made in conjunction with the case in which the cable manager 200 includes a LAN client card as its functional circuit.

The cable manager 200 also includes a LAN modular connector (for example, an RJ-45 jack) 216 for a connection with the plug of a cable (for example, a twisted pair cable) connected to a LAN hub or repeater (not shown). The cable manager 200 further includes additional jacks, attached to the housing of the cable manager 200, namely, a loudspeaker jack 218 and a microphone jack 220. LEDs 222 are also attached on the housing of the cable manager 200 in order to display various operation states of the cable manager 200, respectively. The cable manager 200 is also provided with retractable latches 224 mounted to the housing cable manager 200 and engagable with the latch notches 124 of the computer 100. Connectors 306, 308, 310, 312 and 314 of a mouse, keyboard, printer, modem and display monitor are connected to the ports 206, 208, 210, 212 and 214 of the cable manager 200, respectively. Plugs 301, 318 and 320 of the cable (for example, a 100BASE-T4 twisted pair cable) are connected to the jacks 201, 218 and 220 of the cable manager 200, respectively.

Figure 3:
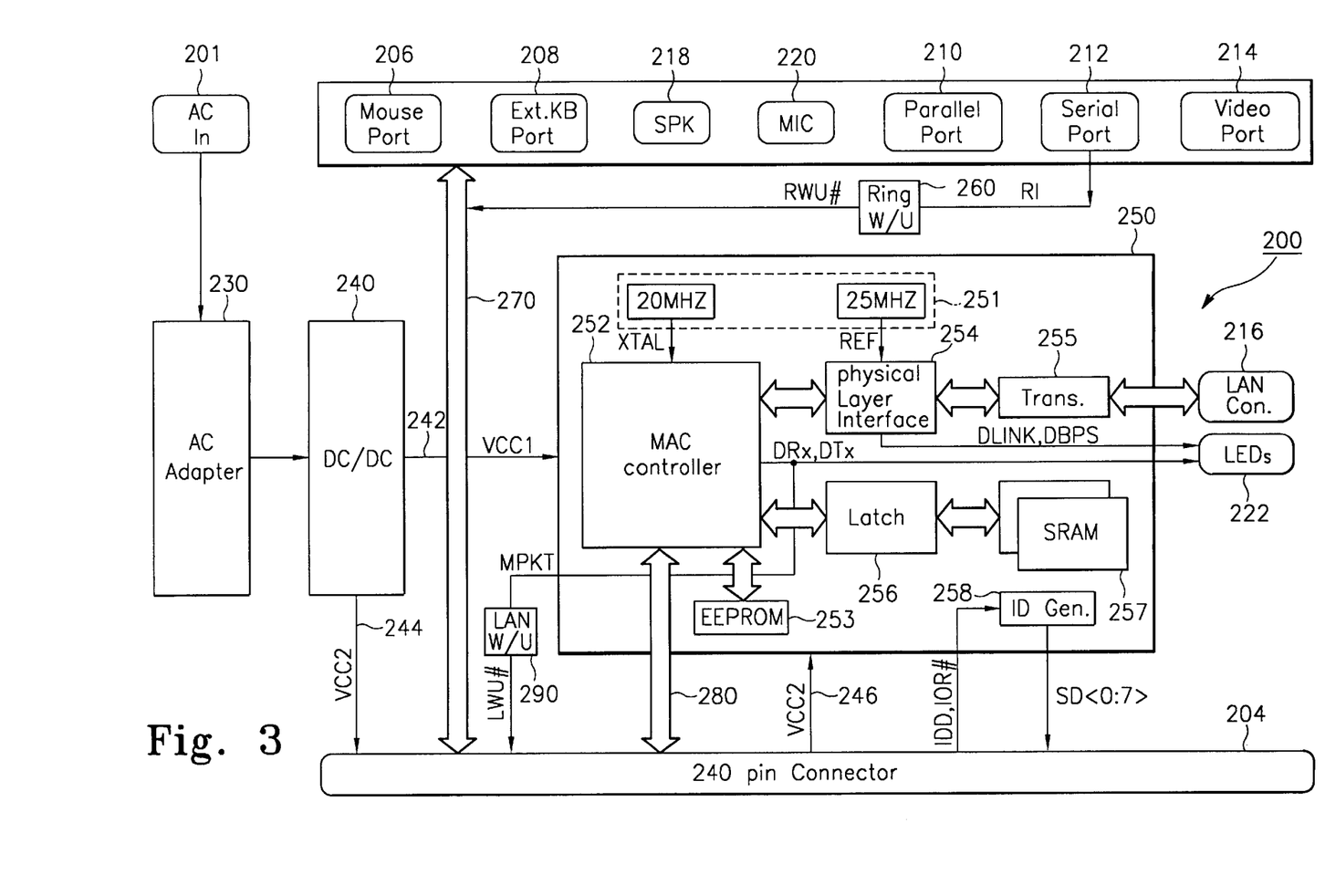
FIG. 3 is a block diagram illustrating the configurations of circuits installed in the cable manager of the computer system shown in FIG. 1.

FIG. 3 illustrates the configurations of circuits attached to the cable manager 200 according to the illustrated embodiment of the present invention. As show in FIG. 3, the cable manager 200 includes a plurality of ports, namely, the ports 206, 208, 210, 212, and 214, a plurality of jacks, namely, 201, 218, and 220, an AC adapter 230, a DC/DC converter 240 for generating a variety of different DC voltages, for example, 3.3V, 5V, and 12V, and a LAN client card 250. The cable manager 200 further includes a ring wake-up circuit 260 for generating a ring wake-up signal RWU# serving to wake up the computer 100 in response to a ring indicator signal RI supplied from an external modem through the serial port 212. Outputs from the ports 206, 208, 210, 212 and 214, jacks 218 and 220, and ring wake-up circuit 260 are electrically connected to the common connector 204 via electrical wirings 270. The computer 100 is woken up by the ring wake-up signal RWU#.

The LAN client card 250 includes an oscillating circuit 251 for generating a reference signal of 20 MHz, XTAL, and a reference signal of 25 MHz, REF, a fast Ethernet transceiver IC (for example, AM79C971, DS21140A, etc.) of 100 Mbps 252, which is typically called a "MAC controller", and an EEPROM 253 for storing information about MAC address, power supply state, link state, and frame transmission/reception rate. As shown in FIG. 3, the LAN client card 250 further includes a physical signaling layer interface (for example, ICS1890, etc.) 254, and a transformer/filter module (for example, ST6114, A556-2006-02, etc.) 255. As well known, the transformer/filter module 255 not only functions as a transformer and filter, but also functions to suppress electromagnetic interference (EMI). The MAC controller 252 is electrically coupled to the common connector 204 via electrical wiring 280. The electrical wiring 280 is interconnected with a CPU (not shown) via a peripheral component interconnect (PCI) bus (not shown). The CPU performs a logical link control for a LAN associated therewith as it executes LAN application programs.

Although not shown in FIG. 3 for convenience sake, the MAC controller 252 has a variety of signal or data lines in accordance with a PCI bus standard supplied thereto. For instance, the MAC controller 252 may have lines respectively associated with clock CLK, reset RST#, address and data AD0 to AD31, command/effective bytes C/BE0# to C/BE3#, parity PAR, frame FRAME#, initiator ready IRDY#, target ready TRDY#, stop STOP#, initialization device select IDSEL, device select DEVSEL#, request REQ#, grant GNT#, parity error PERR#, system error SERR#, and interrupt INTB#. Information transmission and reception between the PCI bus of the computer 100 and the MAC controller 252 are carried out in sync with the rising edge of a clock on the clock line. The MAC controller 252 exchanges information with the physical signaling layer interface 254 in sync with the reference signal XTAL from the oscillating circuit 251. The physical signaling layer interface 254 exchanges information with the transformer/ filter module 255 in sync with the reference signal REF from the oscillating circuit 251.

Referring to FIG. 3 again, the MAC controller 252 activates a reception mode display signal DRx during a frame reception mode, thereby displaying the frame reception mode on the LED 222. The MAC controller 252 also activates a transmission mode display signal DTx during a frame transmission mode, thereby displaying the frame transmission mode on the LED 222. The physical signaling layer interface 254 activates a link display signal DLINK, when it is linked with a LAN server, thereby driving the LED 222 to display the linked state. Accordingly, the user can recognize the linked state of the physical signaling layer interface 254 with the LAN server. The interface 254 drives the LED 222 by a frame transmission/reception rate signal DBPS, thereby allowing the user to recognize whether the frame transmission/reception rate corresponds to 10 Mbps or 100 Mbps.

In accordance with the illustrated embodiment, the LAN client card is also provided with a latch circuit 256 and an SRAM 257 in order to achieve an improvement in the performance of the LAN client card 250. The cable manager 200 also includes an ID information generating circuit 258 adapted to generate ID information SD<0:7> indicative of whether the cable manager 200 is a cable manager with a LAN card, CM#1, a cable manager with a modem card, CM#2, or a cable manager of another type. The ID information generating circuit 258 receives an ID detect signal IDD and an IO read signal IOR# through the common connector 204 and generates ID information SD<0:7> in response to the received signals. Based on the ID information SD<0:7>, the computer 100 recognizes the type of the cable manager 200 connected to the housing thereof. For example, where the ID information is indicative of 'FFh, the computer 100 recognizes the cable manager 200 as a cable manager of a first type, CM#1. For the ID information of 'FE'h, 'FD'h, and 'FC'h, the computer 100 recognizes the cable manager 200 as cable managers of second through fourth cable managers, CM#2 to CM#4, respectively.

The cable manager 200 further includes a LAN wake-up circuit 259 adapted to generate a LAN wake-up signal LWU# in response to a magic packet signal MPKT from the LAN server. The LAN wake-up signal LWU# is sent to the computer 100 via the common connector 204. In response to the LAN wake-up signal LWU#, the computer 100 is woken up.

Figure 4:
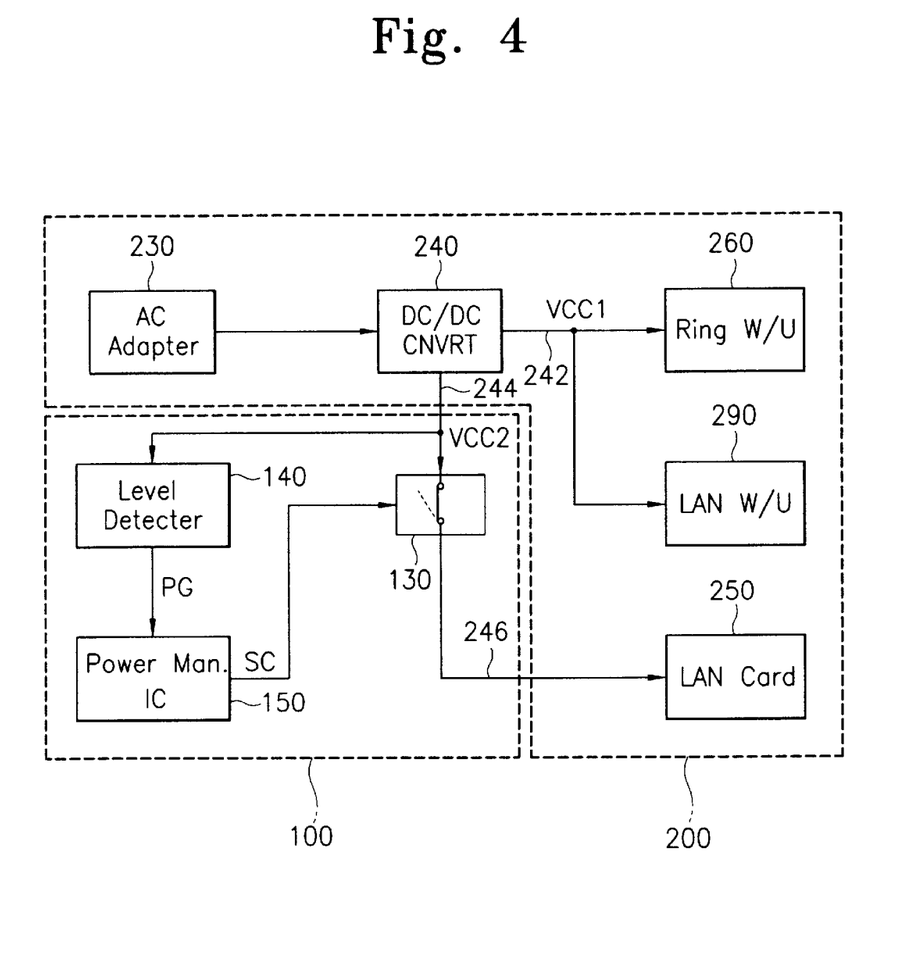
FIG. 4 is a block diagram illustrating the configurations of a power supply circuit included in the computer system of FIG. 1.

FIG. 4 illustrates a power supply circuit included in the computer system in accordance with the illustrated embodiment of the present invention. Referring to FIG. 4, the computer 100 includes a switching circuit 130 and a level detector circuit 140. The DC/DC converter 240 of the cable manager 200 has an output terminal 242 for a DC voltage VCC1 (for example, 3.3V). The output terminal 242 of the DC/DC converter 240 is directly coupled to respective power input terminals of the ring wake-up circuit 260 and LAN wake-up circuit 290. The DC/DC converter 240 also has an output terminal 244 for a DC voltage VCC2 (for example, 5V). The output terminal 244 of the DC/DC converter 240 is coupled to the LAN client card 250 via the switching circuit 130 of the computer 100, an associated pin of the common connector 104 (not shown), and an associated pin 246 of the common connector 204. The level detector circuit 140 generates a power-good signal PG only when the voltage VCC2 at the output terminal 244 is detected to be stable. In other words, no power-good signal is generated when a voltage lower than the voltage VCC2 is outputted from the DC/DC converter 240 or when the voltage at the output terminal 244 of the DC/DC converter 240 is zero (0V), namely, when the computer 100 is energized only by a battery. In order to control the switching circuit 130 in response to the power-good signal PG, the computer 100 also includes a power management IC 150 which has a well-known configuration. The power management IC 150 generates a switching control signal SC, when the power-good signal PG is activated, while generating no switching control signal when the power-good signal PG is inactive. The switching circuit 130 is switched on in response to the switching control signal SC, which is active, thereby allowing the voltage VCC2 to be supplied to the LAN client card 250. When the switching control signal SC is inactive, the switching circuit 130 is switched off, thereby cutting off the supply of the voltage VCC2 from the DC/DC converter 240 to the LAN client card 250.

Alternatively, the switching circuit 130 and level detector circuit 140 may be installed in the cable manager 200. In this case, it will be appreciated that the pin allocation for the common connectors 104 and 104 should be newly set.

As apparent from the above description, the portable computer system according to the present invention can be easily and conveniently used at a place where a LAN is constructed. Since the power supply to a LAN card is possible only through an AC adapter in the computer system of the present invention, it is possible to suppress an unnecessary battery voltage consumption in the portable computer.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. In a cable manager system for connecting a plurality of peripheral devices to a computer, said system comprising:
   a single integrated connector connected to the computer;
   a plurality of peripheral device ports connected to respective ports of the peripheral devices, the peripheral device ports having a variety of shapes; and
   at least one functional circuit for providing at least one additional function to the computer;
   the improvement comprising:
   an ID information generating unit for generating ID information for identifying the type of the cable manager system; and
   a means for connecting the peripheral device ports, the at least one functional circuit, and the ID information generating unit to the integrated connector via internal electrical wiring, said means adapted to prevent delivery of a DC power to the computer when no AC power is being received at the computer from an external supply, adapted to prevent computer operation when a DC voltage delivered to the computer falls below a predetermined voltage level, and adapted to permit the computer to operate only when a stable power supply voltage is supplied to the computer.

2. A cable manager system according to claim 1, further comprising:
   an AC adapter for converting an AC voltage into a DC voltage; and
   a DC/DC converter for generating a plurality of different DC voltages from the DC voltage outputted from the AC adapter.

3. A cable manager system according to claim 2, the functional circuit comprising a local area network (LAN) client card.

4. A cable manager system according to claim 3, further comprising:
 a means for generating a LAN wake-up signal in response to a magic packet signal from a LAN server and for sending a LAN wake-up signal to the computer.

5. A cable manager system according to claim 3, one of the peripheral device ports comprising a modem port connected to a modem, and the cable manager system further comprising a means for generating a ring wake-up signal in response to a ring indicator signal from the modem and for sending the ring wake-up signal to the computer.

6. A cable manager system according to claim 2, one of the peripheral device ports comprising a modem port connected to a modem, and the cable manager system further comprising a means for generating a ring wake-up signal in response to a ring indicator signal from the modem and for sending the ring wake-up signal to the computer.

7. A cable manager system according to claim 1, the functional circuit comprising a local area network (LAN) client card.

8. A cable manager system according to claim 7, further comprising:
 a means for generating a LAN wake-up signal in response to a magic packet signal from a LAN server and for sending a LAN wake-up signal to the computer.

9. A cable manager system according to claim 8, one of the peripheral device ports comprising a modem port connected to a modem, and the cable manager system further comprising a means for generating a ring wake-up signal in response to a ring indicator signal from the modem and for sending the ring wake-up signal to the ID information generating unit to the second common connector via internal electrical wiring; and
 a means for managing the supply of power to the cable manager, based on the DC voltages generated by the DC/DC converter the means being disposed in the computer housing.

10. A cable manager system according to claim 7, one of the peripheral device ports comprising a modem port connected to a modem, and the cable manager system further comprising a means for generating a ring wake-up signal in response to a ring indicator signal from the modem and for sending the ring wake-up signal to the computer.

11. A cable manager system according to claim 1, one of the peripheral device ports is a modem port connected to a modem, and the cable manager system further comprises means for generating a ring wake-up signal in response to a ring indicator signal from the modem and sending for the ring wake-up signal to the computer.

12. In a computer system comprising:
 a computer having a housing;
 a first common connector attached to the computer housing;
 a cable manager having a housing, the cable manager detachably attached to the computer housing;
 disposed in the cable manager housing, an AC adapter for converting an AC voltage into a DC voltage;
 disposed in the cable manager housing, for generating a plurality of different DC voltages from the DC voltage outputted from the AC adapter;
 at least one functional circuit, disposed in the cable manager housing, for providing at least one additional function to the computer;
 a second common connector, attached to the cable manager housing, the second common connector mating with the first common connector; and
 a plurality of peripheral device ports attached to the cable manager housing and connected to respective ports of peripheral devices, the peripheral device ports having a variety of shapes;
 the improvement in the cable manager, comprising:
 an ID information generating unit disposed in the cable manager housing for generating ID information for identifying the cable manager; and
 a means for connecting the peripheral device ports, the at least one functional circuit, and the ID information generating unit to the second common connector via internal electrical wiring; and
 a means for managing the supply of power to the cable manager, based on the DC voltages generated by the AC adapter, the means being disposed in the computer housing, said means adapted to prevent delivery of a DC power to the computer when no AC power is being received at the computer from an external supply, adapted to prevent computer operation when a DC voltage delivered to the computer falls below a predetermined voltage level, and adapted to permit the computer to operate only when a stable power supply voltage is supplied to the computer.

13. The computer system of claim 12, the functional circuit comprising a LAN client card.

14. The computer system of claim 13, further comprising:
 a means for displaying a linked state, transmission and reception operations, and a frame transmission/reception rate of the LAN client card.

15. The computer system of claim 12, the computer recognizing the type of cable manager, based on the ID information.

16. In a computer system comprising:
 a computer having a housing;
 a first common connector attached to the computer housing;
 a cable manager having a housing, the cable manager detachably attached to the computer housing;
 disposed in the cable manager housing, an AC adapter for converting an AC voltage into a DC voltage;
 disposed in the cable manager housing, for generating a plurality of different DC voltages from the DC voltage outputted from the AC adapter;
 at least one functional circuit, disposed in the cable manager housing, for providing at least one additional function to the computer;
 a second common connector, attached to the cable manager housing, the second common connector mating with the first common connector; and
 a plurality of peripheral device ports attached to the cable manager housing and connected to respective ports of peripheral devices, the peripheral device ports having a variety of shapes;
 the improvement in the cable manager, comprising:
 an ID information generating unit disposed in the cable manager housing for generating ID information for identifying the cable manager;
 a means for connecting the peripheral device ports, the at least one functional circuit, and the ID information generating unit to the second common connector via internal electrical wiring;

the functional circuit comprising a LAN client card; and a means for managing the supply of power to the cable manager, based on the DC voltages generated by the DC/DC converter, the means supplying power to the LAN client card after the DC voltages outputted from the DC/DC converter are stable.

17. In a computer system comprising:

a computer having a housing;

a first common connector attached to the computer housing;

a cable manager having a housing, the cable manager detachably attached to the computer housing;

disposed in the cable manager housing, an AC adapter for converting an AC voltage into a DC voltage;

disposed in the cable manager housing, for generating a plurality of different DC voltages from the DC voltage outputted from the AC adapter;

at least one functional circuit, disposed in the cable manager housing, for providing at least one additional function to the computer;

a second common connector, attached to the cable manager housing, the second common connector mating with the first common connector; and a plurality of peripheral device ports attached to the cable manager housing and connected to respective ports of peripheral devices, the peripheral device ports having a variety of shapes;

the improvement in the cable manager, comprising:

an ID information generating unit disposed in the cable manager housing for generating ID information for identifying the cable manager;

a means for connecting the peripheral device ports, the at least one functional circuit, and the ID information generating unit to the second common connector via internal electrical wiring;

the functional circuit comprising a LAN client card; and a means for managing the supply of power to the cable manager, based on the DC voltages generated by the DC/DC converter, the means cutting off the supply of power to the LAN client card only when the computer is energized by a battery.

18. A method of managing cables when connecting a plurality of peripheral devices to a computer by means of a cable manager system, said computer having a single integrated connector connected to the computer; a plurality of peripheral device ports connected to respective ports of the peripheral devices, the peripheral device ports having a variety of shapes; and at least one functional circuit for providing at least one additional function to the computer; said method comprising:

(1) generating ID information for identifying the type of cable manager system; and (2) connecting the peripheral device ports, the at least one functional circuit, and the ID information generating unit to the integrated connector via internal electrical wiring, said functional circuit operating in a manner such that it prevents delivery of a DC power to the computer when no AC power is being received at the computer from an external supply, it prevents computer operation when a DC voltage delivered to the computer falls below a predetermined voltage level, and it permits the computer to operate only when a stable power supply voltage is supplied to the computer.

* * * * *

UNITED STATES PATENT AND TRADEMARK OFFICE
CERTIFICATE OF CORRECTION

PATENT NO. : 6,321,340 B1
DATED : November 20, 2001
INVENTOR(S) : Seong-Kee Shin et al.

It is certified that error appears in the above-identified patent and that said Letters Patent is hereby corrected as shown below:

<u>Title page,</u>
Item [75], Inventors, correct second inventor's name "Chang-Hee Suwon" to -- Chang-Hee Lee --; correct "both of Kyunggi-doo" to -- both of Suwon, Kyunggi- do --;

Signed and Sealed this

Thirtieth Day of April, 2002

*Attest:*

*Attesting Officer*

JAMES E. ROGAN
*Director of the United States Patent and Trademark Office*